(12) United States Patent
Khatiwada

(10) Patent No.: US 10,753,016 B2
(45) Date of Patent: Aug. 25, 2020

(54) METHOD AND APPARATUS TO UTILIZE A COMMINGLED GLASS FIBER

(71) Applicant: Suman Khatiwada, Houston, TX (US)

(72) Inventor: Suman Khatiwada, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 825 days.

(21) Appl. No.: 14/921,103

(22) Filed: Oct. 23, 2015

(65) Prior Publication Data

US 2017/0114480 A1 Apr. 27, 2017

(51) Int. Cl.
| | |
|---|---|
| *D03D 15/00* | (2006.01) |
| *E21B 17/00* | (2006.01) |
| *E21B 33/12* | (2006.01) |
| *B29C 43/00* | (2006.01) |
| B29K 67/00 | (2006.01) |
| B29K 29/00 | (2006.01) |

(52) U.S. Cl.
CPC ........ *D03D 15/0011* (2013.01); *B29C 43/003* (2013.01); *E21B 33/12* (2013.01); *B29K 2029/04* (2013.01); *B29K 2067/043* (2013.01); *B29K 2067/046* (2013.01); *B29K 2995/0062* (2013.01); *D10B 2401/12* (2013.01)

(58) Field of Classification Search
None
See application file for complete search history.

(56) References Cited

U.S. PATENT DOCUMENTS

| | | | | |
|---|---|---|---|---|
| 5,252,642 A | * | 10/1993 | Sinclair | A61L 15/26 |
| | | | | 524/108 |
| 2013/0206273 A1 | * | 8/2013 | Guest | B82Y 30/00 |
| | | | | 138/174 |
| 2016/0177655 A1 | * | 6/2016 | Fripp | E21B 33/12 |
| | | | | 166/376 |

FOREIGN PATENT DOCUMENTS

| | | | |
|---|---|---|---|
| EP | 0738692 | * | 10/1996 |
| JP | H0656472 | * | 3/1994 |
| JP | 2014005552 | * | 1/2014 |

OTHER PUBLICATIONS

Machine translation of JP2014005552, Kazuyuki (Year: 2014).*
Machine translation of JPH0656472, Buruusu et al. (Year: 1994).*

* cited by examiner

*Primary Examiner* — Shawn Mckinnon
(74) *Attorney, Agent, or Firm* — Cantor Colburn LLP

(57) ABSTRACT

In one embodiment, a method to form a downhole element is disclosed, including weaving a continuous glass filament and a continuous degradable thermoplastic filament to form a commingled glass fiber. In another embodiment, a commingled glass fiber is disclosed, including a continuous glass filament, and a continuous degradable thermoplastic filament interwoven with the continuous glass filament. In another embodiment, a downhole element is disclosed, including a commingled glass fiber. The commingled glass fiber includes a continuous glass filament, and a continuous degradable thermoplastic filament interwoven with the continuous glass filament.

7 Claims, 2 Drawing Sheets

METHOD AND APPARATUS TO UTILIZE A COMMINGLED GLASS FIBER

BACKGROUND

Field of the Disclosure

This disclosure relates generally to commingled glass fibers and elements that utilize the same for downhole applications.

Background of the Art

Wellbores are drilled in subsurface formations for the production of hydrocarbons (oil and gas). In many operations it is required to convey components (such as packers, bridge plugs, etc.) in a downhole location to facilitate production of oil and gas. After such operations, conveyed components must be removed or destroyed before following operations can begin. Such removal operations may be costly and/or time consuming. It is desired to provide a material and a downhole component that can provide desired mechanical properties and degradation characteristics.

The disclosure herein provides commingled glass fibers and elements that utilize the same for downhole applications.

SUMMARY

In one aspect, a method to form a downhole element is disclosed, including weaving a continuous glass filament and a continuous degradable thermoplastic filament to form a commingled glass fiber.

In another aspect, a commingled glass fiber is disclosed, including a continuous glass filament, and a continuous degradable thermoplastic filament interwoven with the continuous glass filament.

In another aspect, a downhole element is disclosed, including a commingled glass fiber. The commingled glass fiber includes a continuous glass filament, and a continuous degradable thermoplastic filament interwoven with the continuous glass filament.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The disclosure herein is best understood with reference to the accompanying figures, wherein like numerals have generally been assigned to like elements and in which.

DESCRIPTION OF THE EMBODIMENTS

Figure 1:
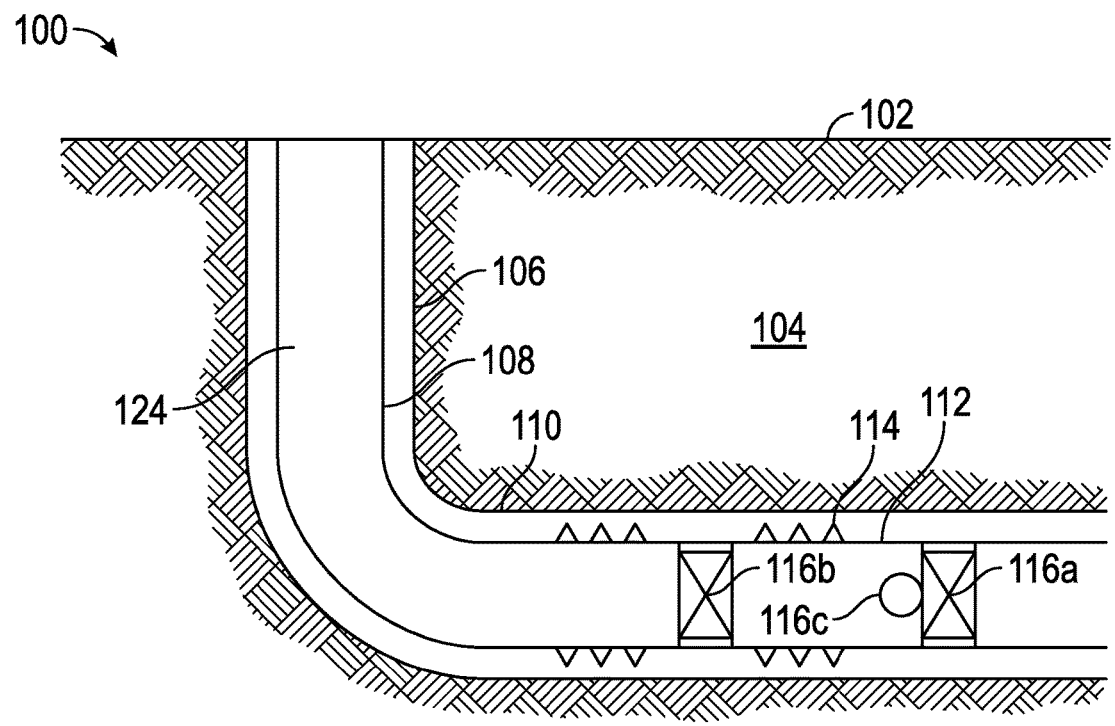
FIG. 1 is a schematic diagram of an exemplary drilling system that includes downhole components according to embodiments of the disclosure.

FIG. 1 shows an exemplary embodiment of a downhole system to facilitate the production of oil and gas. In certain embodiments, system 100 allows for operations to facilitate production of oil and gas. System 100 includes a wellbore 106 formed in formation 104 with casing 108 disposed therein.

In an exemplary embodiment, a wellbore 106 is drilled from a surface 102 to a downhole location 110. Casing 108 may be disposed within wellbore 106 to facilitate production. Wellbore 106 may be a vertical wellbore, a horizontal wellbore, a deviated wellbore or any other suitable type of wellbore or any combination thereof.

To facilitate downhole operations, such as fracturing operations, etc., frac plugs 116a, retainer plugs 116b, and frac balls 116c, or other suitable downhole components are utilized within casing string 108. In certain embodiments, other downhole components can include, but are not limited to casing, mandrels, and housings for downhole tools, etc. After desired operations (such as fracturing operations) and before following operations, conventional downhole components 116a, 116b, 116c are often removed or otherwise destroyed to allow the flow of oil and gas through casing 108. In an exemplary embodiment, downhole components 116a, 116b, 116c are configured remain resident in casing 108 until a predetermined time at which at least portions of downhole components 116a, 116b, 116c dissolve or degrade in response to exposure to the downhole environment 124 to facilitate the production of oil and gas. Advantageously, downhole components 116a, 116b, 116c, etc. can be formed from commingled glass fibers, fabrics and composites described herein to allow for degradable downhole elements that also provide for desirable mechanical properties.

Figure 2:
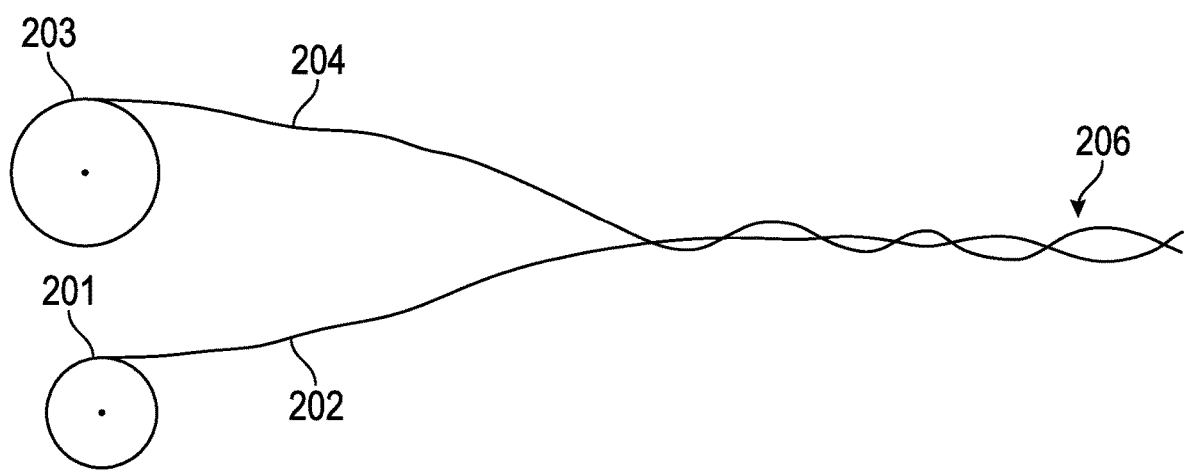
FIG. 2 is a schematic diagram of an exemplary commingled glass fiber according to one embodiment of the disclosure.

Referring to FIG. 2, in an exemplary embodiment, the commingled glass fiber 206 includes a degradable thermoplastic filament 202 and a continuous glass fiber filament 204. Advantageously, the commingled glass fiber 206 utilizes continuous glass reinforcement and an evenly distributed degradable polymer to allow for increased strength and pressure ratings in the resulting composite compared to conventional degradable polymers and composites utilizing discontinuous glass fibers. In certain embodiments, the commingled glass fiber 206 can be woven into a fabric 208 or yarn. In certain embodiments, the commingled glass fabric can be molded into shapes to form downhole components such as downhole components 116a, 116b, and 116c.

In an exemplary embodiment, the degradable thermoplastic filament 202 can be formed of a thermosetting polymer. In certain embodiments, the degradable thermoplastic filament 202 can be biodegradable. In an exemplary embodiment, the degradable thermoplastic filament 202 can be formed from polyglycolide acid, polyvinyl alcohol, or polylactic acid.

In an exemplary embodiment, the degradable thermoplastic filament 202 can be provided from a spool 201. The spool 201 can store and provide the degradable thermoplastic filament 202 as it is processed to form the commingled glass fiber 206. In an exemplary embodiment, the degradable thermoplastic filament 202 is a continuous filament to be commingled with the continuous glass filament 204.

In an exemplary embodiment, the continuous glass filament 204 can be arranged to form a reinforcing mesh in the resulting composite. In certain embodiments, the continuous glass filament 204 can be degradable. The continuous glass filament 204 can be formed from, but is not limited to, a degradable glass such as sodium silicate glass, phosphate glass, etc. Advantageously, the continuous glass filament 204 is continuous to allow for greater strength and reinforcement in the resulting composite compared to chopped or discontinuous reinforcing elements. In an exemplary embodiment, the continuous glass filament 204 can be provided from a spool 203.

In an exemplary embodiment, the degradable thermoplastic filament 202 and the continuous glass fiber filament 204 are combined to form a commingled glass fiber 206. In an exemplary embodiment, the degradable thermoplastic filament 202 and the continuous glass fiber filament 204 can be braided, woven, or otherwise disposed adjacent and around each other to form the commingled glass fiber 206. Advantageously, after the degradable thermoplastic filament 202 and the continuous glass fiber filament 204 are commingled, the commingled glass fiber 206 can be handled or manipulated as a single unit. Further, during processing, such as molding, the degradable thermoplastic filament 202 is evenly distributed with the continuous glass fiber filament 204 at the predetermined proportion to allow for an even distribution of the thermoplastic matrix in the resulting composite.

In an exemplary embodiment, the commingled glass fiber 206 can be between 25% to 35% degradable thermoplastic filament 202 by weight and between 65% to 75% continuous glass fiber filament 204 by weight. In certain embodiments, the commingled glass fiber 206 can be between 25% to 75% continuous glass fiber filament 204 by weight.

Figure 3A:
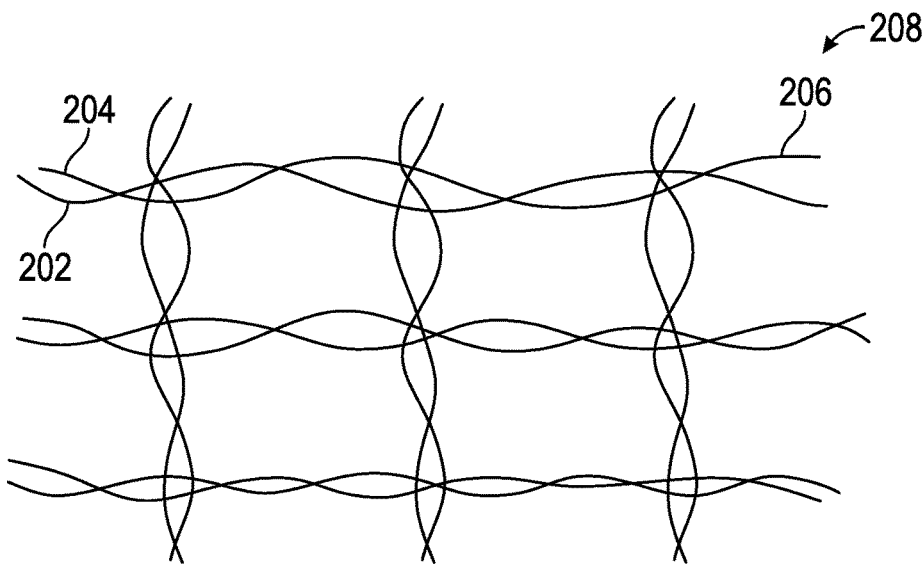
FIG. 3A is a schematic diagram of an exemplary commingled glass fabric formed from a commingled glass fiber, such as the commingled glass fiber of FIG. 2.
Figure 3B:
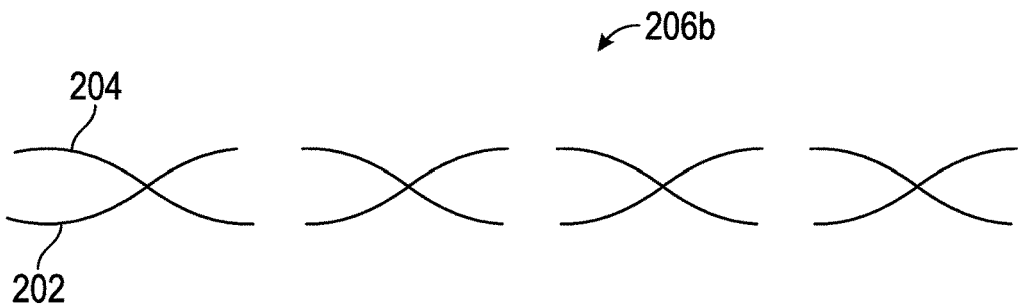
FIG. 3B is a schematic diagram of an exemplary chopped commingled glass fiber formed from a commingled glass fiber, such as the commingled glass fiber of FIG. 2.

Referring to FIG. 3A, in an exemplary embodiment, the commingled glass fiber 206 can be arranged or weaved to form a commingled glass fabric 208. As shown in FIG. 3 the continuous glass fiber filaments 204 are arranged in an ordered manner to provide reinforcement within the thermoplastic matrix in the resulting composite. In certain embodiments, the continuous glass filaments 204 can be arranged in any suitable shape wherein the continuous glass fiber filaments 204 can provide reinforcement. In certain embodiment, the commingled glass fiber 206 can be formed into a yarn. Referring to FIG. 3B, in certain embodiments, the commingled glass fiber 206 can be chopped or cut to form a chopped commingled glass fiber 206b.

In an exemplary embodiment, the chopped commingled glass fiber 206b or the commingled glass fabric 208 can be arranged into a mold to make shapes of composites such as downhole components 116a, 116b, and 116c. In other embodiments, the chopped commingled glass fiber 206b or the commingled glass fabric 208 can be arranged in molds to make shapes such as spheres, tubes, etc. Since the the chopped commingled glass fiber 206b or commingled glass fabric 208 includes the degradable thermoplastic filament 202 distributed throughout the chopped commingled glass fiber 206b or the commingled glass fabric 208, additional resin impregnation techniques are not required. In an exemplary embodiment, the chopped commingled glass fiber 206b or the commingled glass fabric 208 is exposed to heat and pressure during a molding process.

Figure 4:
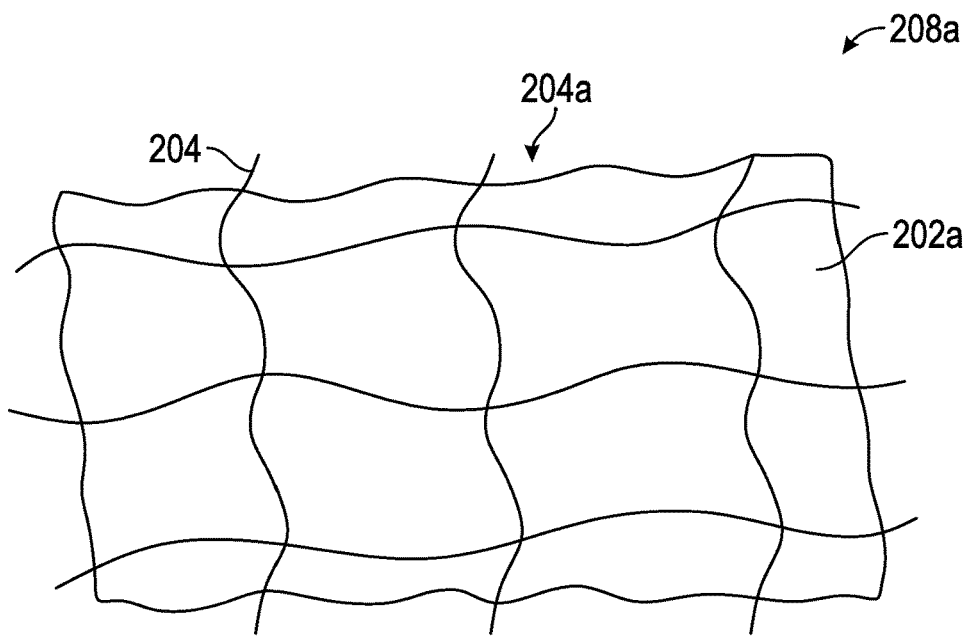
FIG. 4 is a schematic diagram of the commingled glass fabric of FIG. 3A after a molding process to form downhole components, such as the downhole components shown in FIG. 1 for use with a downhole system, according to one embodiment.

Referring to FIG. 4, a commingled glass composite 208a is shown after the commingled glass fabric 208 has been subjected to a molding process. As a result of the molding process, the thermoplastic of the degradable thermoplastic filaments 202 is melted to form a thermoplastic matrix 202a reinforced by the glass reinforcement 204a, which is formed by the continuous glass fiber filaments 204. In an exemplary embodiment, the glass reinforcement 204a is a continuous woven reinforcement, while the thermoplastic matrix 202a is an evenly distributed matrix without any voids for increased strength characteristics.

Advantageously, the degradable thermoplastic filament 202 and the continuous glass fiber filament 204 are commingled to provide a composite that is degradable and provides strength and pressure resistance in the resulting composite 208a. The commingled glass fiber 206 can facilitate strength and pressure resistance by utilizing continuous glass filaments 204 to provide greater reinforcement strength compared to chopped glass fibers or other discontinuous reinforcing materials found in other composites. In the exemplary embodiment, the commingled glass fiber 206 allows for the degradable thermoplastic filament 202 to be evenly and uniformly distributed with the continuous glass fiber filaments 204. Accordingly, the resulting composite 208a provides strength and pressure resistance by allowing a continuous thermoplastic matrix 202a of degradable thermoplastic to be formed evenly around the glass reinforcement 204a without any voids, compared to other composite formation methods such as resin impregnation, etc.

In an exemplary embodiment, the commingled glass composite 208a is utilized to form downhole components such as 116a, 116b, and 116c. In other embodiments, the commingled glass composite 208a is utilized for any suitable component or part.

In certain embodiments, the commingled glass composite 208a is exposed to certain conditions, such as hot water, brine, etc. that are present in a downhole environment. In an exemplary embodiment, the thermoplastic matrix 202a is formed from degradable materials in response to a downhole environment. In certain embodiments, the glass reinforcement 204a is also degradable in response to a downhole environment. In certain embodiments wherein the glass reinforcement 204a is degradable, certain glass fibers can release sodium hydroxide, potassium hydroxide, etc. upon exposure to the downhole environment to accelerate the degradation of the thermoplastic matrix 202a. Advantageously, downhole components 116a, 116b, 116c can be utilized to perform a desired task and then degrade after a predetermined time in the downhole environment, facilitating high strength, high pressure downhole components 116a, 116b, 116c that can be interventionless.

In one aspect, a method to form a downhole element is disclosed, including weaving a continuous glass filament and a continuous degradable thermoplastic filament to form a commingled glass fiber. In certain embodiments, the method further includes weaving the commingled glass fiber to form a commingled glass fabric. In certain embodiments, the method further includes arranging the commingled glass fabric in a shape of the downhole element. In certain embodiments, the method further includes compression molding the commingled glass fabric to melt the degradable thermoplastic filament to form a degradable thermoplastic matrix. In certain embodiments, the method further includes exposing the commingled glass fabric to a brine or hot water solution to degrade the degradable thermoplastic matrix. In certain embodiments, the continuous glass filament is degradable. In certain embodiments, the method further includes exposing the continuous glass filament of the commingled glass fabric to brine or hot water solution to release a glass fiber byproduct, wherein the glass fiber byproduct includes at least one of sodium hydroxide and potassium hydroxide and exposing the degradable thermoplastic matrix to the glass fiber byproduct to accelerate the degradation of the thermoplastic matrix. In certain embodiments, the continuous degradable thermoplastic filament is at least one of a polyglycolic acid, a polylactic acid, and a polyvinyl alcohol. In certain embodiments, the continuous degradable thermoplastic filament is 25% to 35% of the commingled glass fiber by weight. In certain embodiments, the continuous glass filament is 25% to 75% of the commingled glass fiber by weight. In certain embodiments, the method further includes cutting the commingled glass fiber to form a chopped commingled glass fiber, and compression molding the chopped commingled glass fiber to melt the degradable thermoplastic filament to form a degradable thermoplastic matrix.

In another aspect, a commingled glass fiber is disclosed, including a continuous glass filament, and a continuous degradable thermoplastic filament interwoven with the continuous glass filament. In certain embodiments, the continuous glass filament is degradable. In certain embodiments, the continuous degradable thermoplastic filament is at least one of polyglycolic acid, a polylactic acid, and a polyvinyl alcohol. In certain embodiments, the degradable thermoplastic filament is 25% to 35% of the commingled glass fiber by weight. In certain embodiments, the continuous glass filament is 25% to 75% of the commingled glass fiber by weight.

In another aspect, a downhole element is disclosed, including a commingled glass fiber. The commingled glass fiber includes a continuous glass filament, and a continuous degradable thermoplastic filament interwoven with the continuous glass filament. In certain embodiments, the downhole element includes a commingled glass fabric formed from the commingled glass fiber. In certain embodiments, the downhole element is at least one of a frac plug, a frac ball, a retainer plug, a casing, a mandrel, and a tool housing.

The foregoing disclosure is directed to certain specific embodiments for ease of explanation. Various changes and modifications to such embodiments, however, will be apparent to those skilled in the art. It is intended that all such changes and modifications within the scope and spirit of the appended claims be embraced by the disclosure herein.

The invention claimed is:

1. A downhole element, comprising:
   a thermoplastic matrix having a continuous woven reinforcement therein comprising a continuous glass fiber, the continuous glass fiber including:
      a continuous glass filament comprising at least one of sodium silicate glass and phosphate glass; and
      a continuous degradable thermoplastic filament interwoven with the continuous glass filament; wherein the continuous glass filament degrades to release at least one of sodium hydroxide and potassium hydroxide to accelerate a decomposition of the thermoplastic matrix.

2. The downhole element of claim 1, wherein the continuous degradable thermoplastic filament is at least one of polyglycolic acid, a polylactic acid, and a polyvinyl alcohol.

3. The downhole element of claim 1, wherein the degradable thermoplastic filament is 25% to 35% of the commingled glass fiber by weight.

4. The downhole element of claim 1, wherein the continuous glass filament is 25% to 75% of the commingled glass fiber by weight.

5. The downhole element of claim 1, wherein the continuous glass filament is degradable.

6. The downhole element of claim 1, further comprising a commingled glass fabric formed from the commingled glass fiber.

7. The downhole element of claim 1, wherein the downhole element is at least one of a frac plug, a frac ball, a retainer plug, a casing, a mandrel, and a tool housing.

* * * * *